No. 702,613. Patented June 17, 1902.
W. G. BABCOCK, Dec'd.
B. C. BABCOCK, Administratrix.
ESCAPEMENT MECHANISM FOR TYPE WRITERS.
(Application filed Aug. 26, 1901.)
(No Model.) 2 Sheets—Sheet 1.
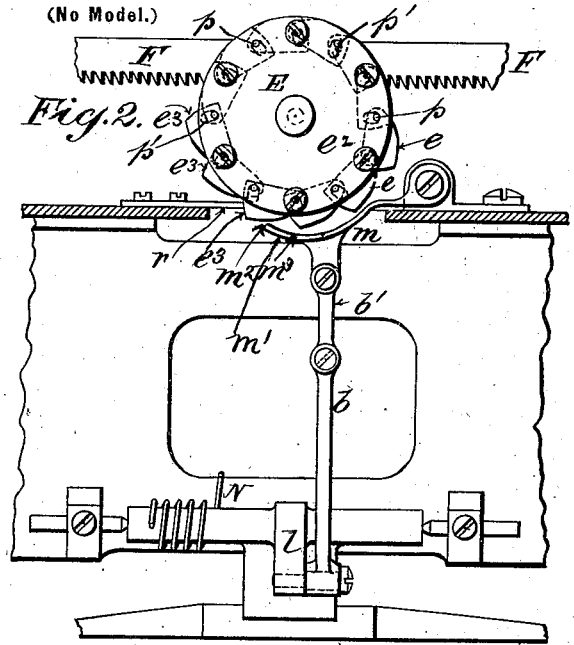
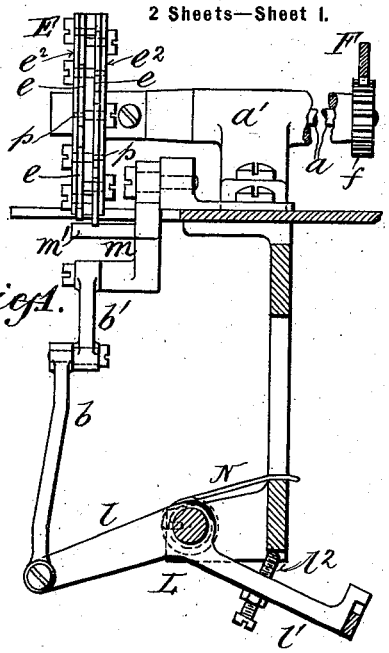
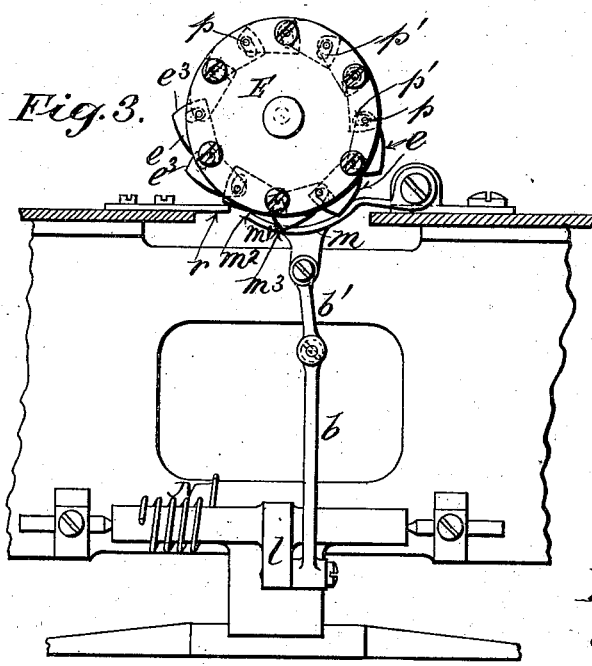
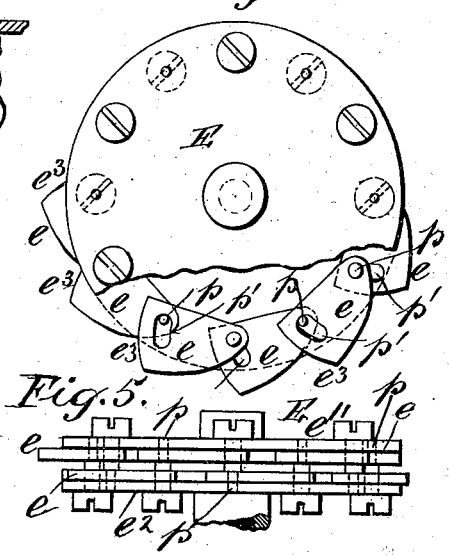
WITNESSES
Edward G. Harham
John Kirn
INVENTOR
William G. Babcock
BY
Geo. Wm. Miatt
ATTORNEY No. 702,613. Patented June 17, 1902.
W. G. BABCOCK, Dec'd.
B. C. BABCOCK, Administratrix.
ESCAPEMENT MECHANISM FOR TYPE WRITERS.
(Application filed Aug. 26, 1901.)
(No Model.) 2 Sheets—Sheet 2.
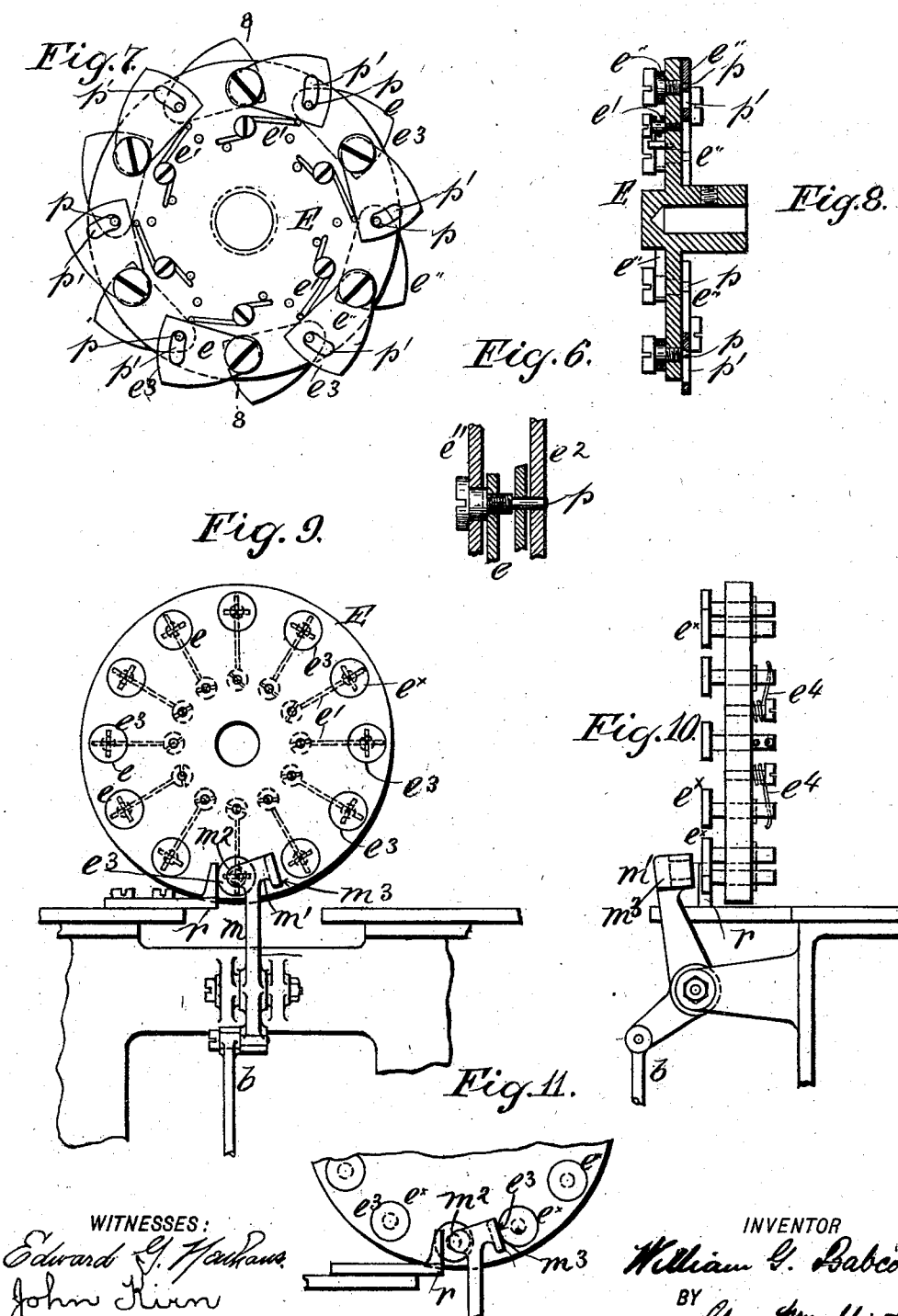
WITNESSES:
Edward G. Hashaus
John Kun
INVENTOR
William G. Babcock
BY
Geo. Wm Miatt
ATTORNEY

UNITED STATES PATENT OFFICE.

WILLIAM G. BABCOCK, OF BROOKLYN, NEW YORK; BERTHA G. BABCOCK ADMINISTRATRIX OF SAID WILLIAM G. BABCOCK, DECEASED.

ESCAPEMENT MECHANISM FOR TYPE-WRITERS.

SPECIFICATION forming part of Letters Patent No. 702,613, dated June 17, 1902.

Application filed August 26, 1901. Serial No. 73,251. (No model.)

*To all whom it may concern:*

Be it known that I, WILLIAM G. BABCOCK, a citizen of the United States, residing in the city of New York, borough of Brooklyn, county of Kings, and State of New York, have invented certain new and useful Improvements in Escapement Mechanism for Type-Writers, of which the following is a specification sufficient to enable others skilled in the art to which the invention appertains to make and use the same.

My invention relates to the escapement mechanism of type-writer machines. Heretofore, so far as I am aware, devices known and used for this purpose have never been accurate and positive in action at the higher rates of speed attainable by expert operators, for the reason that the escapement-dogs could not release and recover with sufficient rapidity. For instance, if the releasing-dog does not clear the rack the letters are superposed. If the releasing-dog clears the rack, the action of the pivoted reëngaging dog may be too slow to intercept the succeeding tooth of the rack, but will strike the tooth itself, and the letters will be close and blurred, or if a key is not released fully between strokes the same letter may be printed twice in the same spot, as in the case of the use of a double letter, instead of being properly spaced. By my improvements I obviate these difficulties and attain a complete positive movement of the rack, as well as increased quickness and delicacy of action. This I accomplish by arranging my escapement rack-teeth or rather the equivalent of rack-teeth in line with a rigid holding-dog, which engages the teeth successively and positively until they are individually released by a movable dog, in contradistinction to the old method of arranging the escapement-teeth at right angles to two movable parallel dogs upon a common vibratory bar or rocker, my escapement teeth or pawls being capable of retraction by the movable releasing-dog in order to clear the stationary holding-dog and being automatically protrusible in assuming their normal positions, substantially as hereinafter set forth. In other words, the essential and distinguishing feature of my invention consists in substituting for the escapement-wheel with rigid teeth heretofore employed upon the shaft carrying the carriage-rack pinion one or more disks or wheels upon which are mounted peripherally retractable and protrusible pawls in lieu of fixed teeth, the pawls engaging successively with a fixed dog or retaining-shoulder, from which they are released by a movable dog actuated indirectly by the key mechanism, which movable dog temporarily engages each succeeding pawl until the letter is printed and then allows the pawl to advance into contact with the stationary dog, to be held by the latter until in turn depressed to admit of the partial rotation of the carriage-rack pinion. By this means there is no possibility of slipping or skipping a tooth, since the fixed dog is always in the line of engagement with the escapement-wheel, whereas heretofore both vibrating dogs have cleared the escapement-wheel or rack-teeth temporarily, and thus have lost positive control of the carriage for the time being.

In the accompanying drawings I, by way of illustrating a practical application of my invention, show the latter as embodied in a No. 6 Remington type-writer, although it is adaptable for use in various styles of typewriting machines, either as an attachment or incorporated in the original structure, and I do not, therefore, confine myself to the identical form and arrangement of parts shown, since it is obvious that various modifications and mechanical expedients may be resorted to in adapting my invention to special requirements of use without departing from the spirit and intent thereof.

Figure 1 is a vertical cross-section of the rear part of the type-writer, showing the escapement mechanism in elevation; Fig. 2, an elevation taken on a plane at right angles to Fig. 1, showing the parts in their normal positions; Fig. 3, a similar view illustrating the escapement action. Fig. 4 is an enlarged rear view of the escapement-wheel, one side of which is partly broken away to show a preferred arrangement of my protractable pawl-teeth. Fig. 5 is a top view of Fig. 4. Fig. 6 is a sectional detail view showing the way the pawl-teeth are supported in the construction illustrated in the first five figures. Fig. 7 shows a modification of the escapement-wheel; Fig. 8, a section upon plane of line 8 8, Fig. 7. Figs. 9 and 10 are elevations taken at right angles to each other, illustrating another modification. Fig. 11 is a detail view illustrating the escapement movement of the modification shown in Figs. 9 and 10.

F is the feed-rack upon the usual carriage, actuated by a mainspring which tends constantly to draw the carriage to the left. The teeth of the feed-rack F engage with teeth of the pinion $f$ upon the inner end of a shaft $a$, journaled in a bracket $a'$, rigidly mounted upon the frame of the machine. On the opposite or rear end of this shaft $a$ is mounted my improved escapement-wheel E. The peculiarity of this escapement-wheel is that its teeth are retractable and protrusible instead of being rigid, as heretofore, so that they may successively be pressed inward by the movable or actuating dog $m$ to clear the rigid dog $r$ to allow the wheel to turn under the impetus of the mainspring attached to the carriage, the movable dog $m$ checking and holding the wheel temporarily by reason of its engagement with the next succeeding tooth. In fact, the teeth $e$ $e$ $e$ of the escapement-wheel are essentially pawls, and I shall hereinafter designate them as such, the distinguishing feature of these pawls $e$ $e$ $e$ being that they are made automatically protrusible for the purpose of engagement successively first with the movable or actuating dog $m$ and next with the rigid dog $r$, substantially as hereinafter set forth. This feature of automatic protrusion of the pawl-teeth $e$ $e$ $e$ may be attained in various ways with like results. Thus in Figs. 1 to 5, inclusive, gravity alone is relied upon to return the pawl-teeth $e$ $e$ $e$ to their normal positions. In Figs. 7 and 8 external springs $e'$ $e'$ cause the protrusion of the teeth $e''$ $e''$ after they have cleared the rigid dog $r$, in which the teeth $e''$ $e''$ may be designated as "spring-pawls," while in Figs. 9, 10, and 11 the pawls $e^\times$ $e^\times$ are pressed laterally out of engagement with the stationary dog $r$ by the movable dog $m$, which thus intrudes in the path of the next succeeding pawl $e^\times$ and holds the disk E, as shown in Fig. 11, until the key is released, when the movable dog $m$ swings back laterally out of the path of the pawl $e^\times$, thereby allowing the pawl it held to pass to the stationary dog $r$ and at the same time releasing the preceding pawl, so that its spring $e^4$ can return it to its normal position. It will be seen that these variations of structure are mechanical equivalents, and other mechanical expedients may be resorted to, if desired, for the purpose of rendering the pawl-teeth of the escapement-wheel automatically protrusive. It being understood that I do not limit myself in this respect, I will further describe the structure of escapement-wheel E shown in the first five figures, in which the wheel is composed of the two disks $e^2$ $e^{22}$, with the retractable and protrusible pawl-teeth $e$ $e$ pivotally supported between them. The pivots $p$ in this arrangement perform a double function in that each acts as the fulcrum for one pawl-tooth while also acting as a stop to limit the movement of the succeeding tooth, each of the latter being formed with slots $p'$, through which a pivot $p$ protrudes, as will be understood by reference more particularly to Fig. 6.

It will be noticed that alternate pawl-teeth are arranged against the inner sides of the opposed disks $e''$ $e^2$, so that the ends of adjoining pawl-teeth overlap each other or "break joints," thus admitting of the employment of a number of teeth pivoted peripherally upon a wheel of relatively small diameter, thereby reducing the distance between the faces $e^3$ $e^3$ of adjoining teeth to the minimum. A like result is attained in the modification shown in Figs. 7, 8, 9, and 10, the pawl-teeth $e''$ $e''$ in Figs. 7 and 8 being shown as pivotally supported upon opposite sides of a single disk, while those in Figs. 9 and 10 are composed of compressible studs protruding automatically from one side of a single disk and capable of depression to clear the stationary dog $r$ by the laterally-vibrating dog $m$, actuated indirectly by the key mechanism.

In either arrangement in the path of the protruding pawl-teeth $e$ $e$ or $e''$ $e^\times$ is situated the rigid dog $r$, affixed to a stationary part of the apparatus. The function of the rigid stationary dog $r$ is the same as that of the pivoted dog heretofore mounted upon a dog rocker-arm, as set forth in my Letters Patent No. 617,798, issued January 17, 1899—namely, to hold the carriage through the medium of the escapement-wheel E, shaft $a$, pinion $f$, and rack F against the pull of the mainspring as long as said rigid stationary dog $r$ is in engagement with the face $e^3$ of one of the pawl-teeth $e$.

The pawl-teeth $e$ $e$ are tripped or retracted successively from engagement with the rigid dog $r$ by means of a movable actuating-dog $m$, one end of which is pivotally supported upon a stationary part of the apparatus and the other end of which is formed with a laterally-projecting tripping-arm $m'$. This pivoted actuating-dog $m$ is connected with mechanism situated between it and the key-lever mechanism in such manner that each time a key is struck the tripping-toe $m^2$ of the lateral actuating-arm $m'$ will push the pawl-tooth $e$ against which it rests upward or inward until the face $e^3$ of the tooth clears the rigid stationary dog $r$, when the mainspring acting on the carriage and through the rack F, pinion $f$, shaft $a$, and wheel E will cause the latter to rotate until the face of the succeeding tooth $e$ comes in contact with the retaining-shoulder $m^3$ of the lateral arm $m'$ of the movable dog $m$, thereby dogging the wheel temporarily until the letter is printed and the key released, when the retraction of the movable dog $m$ will withdraw the shoulder $m^3$ of the lateral arm $m'$ from contact with the face of the intercepted tooth and allow the wheel to rotate until the face of said tooth encounters the end of the rigid stationary dog $r$, thereby locking the carriage until a key is again struck.

The mechanism for actuating the movable releasing-dog $m$ is of secondary importance and may vary with the style and make of type-writing machine to which my invention may be applied, so that I do not confine myself to the means herein shown, which are used by way of illustration only and as adapting my improved escapement mechanism to what is known as the "Remington" machine. As shown in the first five figures of the drawings, the releasing-dog $m$ is connected by a jointed connection-rod $b\ b'$ with the rear arm $l$ of a rock-lever L, the other arm $l'$ of which carries an adjustable stop $l^2$, which tends constantly to engage with a stationary part of the apparatus by reason of the pressure of a spring N, acting upon the rock-lever L.

In Figs. 9 and 10 the link $b'$ is omitted and the dog $m$ is pivotally connected directly to the rod $b$.

When a type-key is depressed, the forward arm $l'$ of the rock-lever L is depressed by well-known means, thereby rocking the lever L against the resistance of the spring N and causing the rear arm $l$ to raise the movable actuating-dog $m$ through the medium of the connection-rod, thus releasing and then temporarily checking the escapement-wheel, as hereinbefore described, until the release of the type-key, when the spring N returns the parts to their normal positions.

It will be seen that by my arrangement of the stationary rigid dog practically in the same plane with my retractable and automatically-protrusible pawl-teeth the escapement mechanism is necessarily positive in action, since the rigid dog $r$ affords an absolute barrier to the passage of the pawl-teeth until the latter are positively retracted by the movable releasing or actuating dog $m$, so that no skipping or irregularity of action is possible.

In the old form of escapement mechanism the lateral movement of the dogs in front of the teeth of the escapement wheel or rack renders their action uncertain, owing to variations in the speed acquired by the carriage under varying conditions of use. Thus with a strong mainspring and a rapid manipulation of the keys the carriage, being independent and free for a fraction of the time requisite to effect the vibration of the dog rocker-arm, may acquire a momentum sufficient to carry a tooth beyond the plane of action of the dogs, thereby causing the machine to skip. By my device skipping is obviously impossible, since the succeeding pawl-teeth are in the same plane as the rigid dog $r$, which is stationary, and it is therefore practically impossible for a pawl-tooth to pass the rigid dog until released by the actuating-pawl $m$.

My improved escapement mechanism admits of the operation of the machine at a relatively high rate of speed, not only because it is absolutely positive in action, as hereinbefore set forth, but also because of the quickness with which the release of the escapement-wheel is effected.

What I claim as my invention, and desire to secure by Letters Patent, is—

1. In a type-writer escapement the combination of an escapement-wheel formed with retractable and protrusible pawl-teeth, a stationary dog protruding into the path of said pawl-teeth, and a movable dog arranged to force the pawl-teeth successively out of engagement with said stationary dog together with means for actuating said movable dog through the medium of the key mechanism.

2. In a type-writer escapement the combination of an escapement-wheel formed with retractable and protrusible pawl-teeth, a stationary dog protruding into the path of said pawl-teeth, and a movable dog arranged to force the pawl-teeth successively out of engagement with said stationary dog and to engage the next succeeding pawl-tooth temporarily, together with means for actuating said movable dog through the medium of the type-writer key mechanism, substantially as set forth.

3. In a type-writer escapement, the combination of an escapement-wheel having retractable pawl-teeth, means for returning said pawl-teeth to their normal positions automatically, a stationary dog protruding into the path of said pawl-teeth, and a movable dog arranged to force the pawl-teeth successively out of engagement with said stationary dog and to engage the next succeeding pawl-tooth temporarily, together with means for actuating said movable dog through the medium of the type-writer key mechanism, substantially as set forth.

4. In a type-writer escapement, the combination of the escapement-wheel E, formed with the retractable and protrusible pawl-teeth $e, e$, the stationary dog $r$, the movable dog $m$, and means for actuating said movable dog through the medium of the key mechanism of a type-writing machine, substantially as set forth.

5. In a type-writer escapement the combination of the escapement-wheel E, formed with the retractable and protrusible pawl-teeth $e, e$, the stationary dog $r$, the movable dog $m$, formed with the tripping-toe $m^2$, and with the detaining-shoulder $m^3$, and means for actuating said movable dog through the medium of the key mechanism of a type-writing machine, substantially as set forth.

6. In a type-writer escapement, the combination with the carriage-rack F, pinion $f$, and shaft $a$, of the escapement-wheel E, mounted on said shaft, and formed with the retractable and protrusible pawl-teeth $e, e$, the stationary dog $r$, projecting into the path of said pawl-teeth the movable tripping-dog $m$, and means for actuating said movable dog through the medium of the key mechanism of a type-writing machine.

7. In a type-writer escapement, the combination of an escapement-wheel, formed with the retractable pawl-teeth on said escapement-wheel, a rigid stationary dog projecting into the path of said pawl-teeth when in their normal positions, and means for releasing said pawl-teeth successively from engagement with said stationary dog through the medium of the key mechanism of a type-writing machine, substantially as set forth.

8. In a type-writer attachment the combination of an escapement-wheel, formed with the retractable pawl-teeth on said escapement-wheel a rigid stationary dog projecting into the path of said pawl-teeth when in their normal positions, a movable dog formed with a tripping-toe for releasing a preceding pawl-tooth from the said stationary dog and with a retaining-shoulder for holding the next succeeding pawl-tooth temporarily and means for actuating said movable dog through the medium of the key mechanism of a type-writing machine, substantially as set forth.

9. In a type-writer attachment, the combination of an escapement-wheel, formed with the retractable and protrusible spring-pawls pivotally connected to said escapement-wheel, a rigid stationary dog projecting in the path of said spring-pawl teeth when protruded, a movable dog formed with a tripping-toe for releasing said spring-pawl teeth from said stationary dog, and means for actuating said movable dog by the key mechanism of a type-writing machine, substantially as set forth.

WILLIAM G. BABCOCK.

Witnesses:
D. W. GARDNER,
GEO. WM. MIATT.